United States Patent
Aleksoff (10) Patent No.: US 6,611,645 B2
(45) Date of Patent: Aug. 26, 2003

(54) SIGNAL ANALYZER USING TAPPED OPTICAL FIBERS

(75) Inventor: Carl Aleksoff, Dexter, MI (US)

(73) Assignee: Veridian ERIM International, Ann Arbor, MI (US)

( * ) Notice: Subject to any disclaimer, the term of this patent is extended or adjusted under 35 U.S.C. 154(b) by 180 days.

(21) Appl. No.: 09/765,215

(22) Filed: Jan. 18, 2001

(65) Prior Publication Data

US 2002/0146206 A1 Oct. 10, 2002

(51) Int. Cl.⁷ .................................................. G02B 6/26
(52) U.S. Cl. ........................................................ 385/48
(58) Field of Search ............................. 385/2, 4, 8, 10, 385/14–17, 27, 31, 37, 40, 48, 123, 130, 131, 901

(56) References Cited

U.S. PATENT DOCUMENTS

| | | | |
|---|---|---|---|
| 5,061,032 A | 10/1991 | Meltz et al. ................... 385/37 |
| 5,351,321 A | 9/1994 | Snitzer et al. ................. 385/10 |
| 5,832,156 A | 11/1998 | Strasser et al. ............... 385/48 |
| 5,850,302 A | 12/1998 | Strasser et al. ............. 359/127 |
| 6,137,612 A | * 10/2000 | Startup ....................... 359/172 |

* cited by examiner

Primary Examiner—Khiem Nguyen
(74) Attorney, Agent, or Firm—Gifford, Krass, Groh, Sprinkle, Anderson & Citkowski, PC (57) ABSTRACT

A signal analyzer is being developed that is based on a periodically tapped optical fiber. The spatial distribution of taps produces a waveform that is weighted by a spatial light modulator (SLM), optically Fourier transformed, and then detected with a video camera to continually display the power spectrum of the signal propagating in the fiber. Alternatively, a digital holographic technique can be implemented that avoids using a SLM. The analyzer resolution and bandwidth is dependent on the distribution and number of taps. Taps have been formed in the core of fibers using UV light. Both single step beamsplitter and localized phase grating taps have been generated. Bragg grating taps tilted at 45 degrees with respect to the fiber axis were generated in order to diffract light directly out of the side of the fiber.

14 Claims, 9 Drawing Sheets

SIGNAL ANALYZER USING TAPPED OPTICAL FIBERS

FIELD OF THE INVENTION

This invention relates generally to optical spectrum analysis and, in particular, to a signal analyzer using tapped optical fibers, preferably with phase compensation.

BACKGROUND OF THE INVENTION

Various gratings and interferometers have been used to extract the power spectrum of light carried by an optical fiber, including gratings embedded within the core of the fiber itself. As one example, U.S. Pat. No. 5,850,302 discloses an optical waveguide communication system including an optical fiber having a refractive index grating and coupling means selected such that at least a portion of the light is transferred from a guided mode into a radiation mode and is available for utilization by utilization means (e.g., a detector) outside of the waveguide and the coupling means. The optical fiber comprises a chirped and blazed refractive index Bragg grating selected such that at least a portion of the light in the guided mode is transferred into a non-guided mode.

The article further comprises utilization means for utilizing the light in the non-guided mode. In one embodiment, a conventional optical coupler is used to couple a small fraction (e.g., 5%) of multichannel signal power from the fiber. The coupled-out light propagates through the fiber to Fabry-Perot filter. The filter is selected to have very narrow transmission bands which pass through the filter and propagates to a dispersive waveguide tap (DWT) where the spectrum is spatially dispersed and detected. According to the patent, the DWT may be a tap in the fiber to provide increased spatial separation of the various wavelengths.

However, all existing techniques of this kind use a much more limited range of time delay and, hence, have poorer resolution and a more limited time-bandwidth-product. Current interferometer arrangements may need to use a scanning in one of the interferometer legs and hence do not give the entire spectrum at one time. Thus, the need remains for an approach that uses optical taps to provide a larger time-bandwidth-product, particularly for spectrum analysis purposes.

SUMMARY OF THE INVENTION

This invention improves upon the prior art by taking advantage of two-dimension fiber delay radiator (FDR) to generate a large time-bandwidth-product spectrum that can not be done with conventional one-dimensional device. The approach also produces a much finer resolution than a conventional one-dimensional device and hence can analyze the fine spectral structure of signals.

In the preferred embodiment, the device is made with taps that are Bragg gratings orientated at 45 degrees to the fiber core, which is not true for current devices. Hence, the light for the inventive device comes directly out of the side of the fiber, linearly polarized. The side-firing configuration also simplifies the required optics.

The optical fiber is wound on a cylindrical-like form such that a number of loops of the fiber are available for making a number of taps on each loop. Taps are preferably generated along each loop of the fiber so that a small portion of the light propagating in the fiber will exit sideways from fiber at the taps. The taps are preferably tilted Bragg type gratings formed in the core of the fiber. A lens system is then used to capture the light from the taps and produce the Fourier Transform of the total distribution of light from all the taps. A video camera then captures this Fourier Transform light and the power spectrum of the light signal is displayed on a monitor.

The preferred construction of the FDR would produce taps with perfect phase characteristics such that the arrangement described above would suffice. However, this is probably not practical to generate or maintain such taps. Hence, alternative embodiments are used and described herein. One includes a phase spatial light modulator to correct and modify the tap phases. Another uses a coherent reference wave to generate a holographic optical element (or complex spatial light modulator) to correct the tap phases and amplitudes. The architecture for which we have experimentally demonstrated the operation of the analyzer uses a digital holographic technique to correct for tap phases. In this technique, a coherent reference source and a detector array are used to capture the radiation amplitude pattern of the FDR. Then, with digital processing of the captured pattern, the desired spectral signal properties are obtained.

DETAILED DESCRIPTION OF THE INVENTION

In following sections, a signal analyzer according to the invention is described in detail. The disclosed concepts and technologies are a hybrid in the sense that part of the processing is associated with the fiber and part with free-space bulk elements. Central to the design is a Fiber Delay Radiator (FDR) which uses a periodically tapped optical fiber to generate delayed samples of modulated light inserted into the fiber. The signal of interest, the modulation of the light coupled into the fiber, is impressed on the spatial waveform generated by the FDR and can be processed, after phase correction, by a lens to generate the desired power spectrum. In some respects, this type of analyzer is similar the type that is based on acousto-optic devices. However, in comparison to the acousto-optic device, the FDR is self radiating and has the potential for more diverse range of time delays, which leads to a larger range of potential applications.

Figure 1:
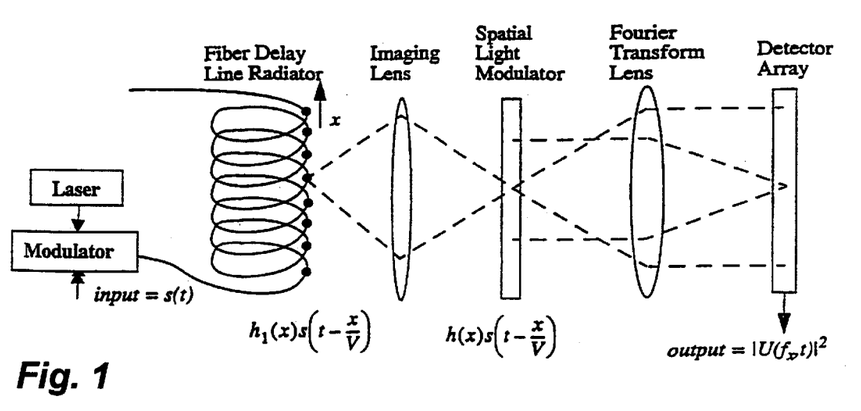
FIG. 1 basic architecture for an optical-fiber based spectrum analyzer according to the invention.

The basic architecture of an optical-fiber based spectrum analyzer according to the invention is illustrated in FIG. 1. For this analyzer, light modulated with the signal to be analyzed is coupled into a single-mode optical fiber wound uniformly on a cylinder. The fiber is tapped periodically along a straight line parallel to the cylinder's axis, forming the FDR. The taps convert the time-varying signal propagating in the fiber into a sampled spatially-varying output signal.

The radiator output is then imaged onto a spatial light modulator (SLM), which, in effect, controls the amplitude and phase of the taps. Although the SLM is used to primarily correct the tap coefficients, it in general can be a real time adjustable filter. The next lens produces the Fourier Transform of complex amplitude light exiting the SLM. The detector array then acquires the power spectrum of the signal.

As to the theory of operation, an optical fiber is assumed tapped at N equally separated positions such that the output light from the fiber is given by $$u(x, t) = s\left(t - \frac{x}{V}\right) \times h_1(x), \quad (1)$$

where the spatial samples (taps) are described by $$h_1(x) = \sum_{n=-M}^{M} a_n \times d(x - n \times Dx). \quad (2)$$

Here, s(t) is the input signal, $a_n$ are the (complex) tap coefficients, $\Delta x$ is the spacing of the taps, N=2M+1 is the number of taps, and V=$\Delta$xv/l is the effective velocity along the tap direction, l is the loop length, and v is the propagation velocity of the light in the fiber. The fiber output is imaged onto the spatial light modulator (SLM) which has transmission coefficients $b_n$ corresponding to the same nth position as that of the fiber. Thus, the amplitude of the light after the SLM is given by $$u(x, t) = s\left(t - \frac{x}{V}\right) \times h(x), \quad (3)$$

where $$h(x) = \sum_{n=-M}^{M} a_n \times b_n \times d(x - n \times Dx). \quad (4)$$

We next take the spatial Fourier Transform (FT) of u(x, t) with the lens. This operation is described by $$U(f_x, t) = \int u(x, t) \times exp(-i2p \times x \times f_x) \times dx, \quad (5)$$

where $f_x$=x/$\lambda \cdot$L is the normalized spatial coordinate with $\lambda$ the optical wavelength and L the lens focal length. The application of this FT to Eq. 4 gives $$U(f_x, t) = -V \times exp(-i2p\ V \times t \times f_x) \times [S(-V \times f_x) \ä\ H(f_x)], \quad (6)$$

where $S(f_x)$ is the FT of s(x), the symbol ⊗ represents the convolution operation. The point spread function for the system is $H(f_x)$, the FT of $h(f_x)$, given by $$H(f_x) = \sum_{n=-M}^{M} a_n \times b_n \times exp(-i2p \times n \times Dx \times f_x). \quad (7)$$

The SLM can be used to correct for the amplitude and phase errors of the taps such that we can assume that $a_n b_n$=1/N and obtain $$H(f_x) = \frac{\sin(p \times N \times Dx \times f_x)}{N \times \sin(p \times Dx \times f_x)}. \quad (8)$$

In general, the discrete nature of the taps will generate multiple diffractive orders, from which we pick one interval to consider as our free spectral range. If we consider the zero order and operate $f_x$ near the origin then Eq. 8 can be approximated by $$H(f_x) >> \sin c(N \times Dx \times f_x), \quad (9)$$

where sinc(z) B sin(p z)/p z. From the above equations we see that the FT signal $U(f_x, t)$ is characterized by a free spectral range of /$\Delta$x, a resolution of /N$\cdot\Delta$x, and a varying temporal frequency as a linear function of spatial position given by $f_x$. Thus, there exists an one-to-one linear correspondence between temporal frequency and spatial position (i.e., spatial frequency).

The output signal as sensed with the detector array is proportional to $|U(f_x, t)|^2$, which is the power spectrum of the input time signal displayed as a light intensity pattern. Specifically, $$|U(f_x, t)|^2 = |V \times S(-V \times f_x) \ä\ H(f_x)|^2. \quad (10)$$

For example, if the input signal is a single frequency as given by s(t)=A>exp(2p i×n×t), then $$|U(f_x, t)|^2 = A^2 \times \sin c^2[N \times Dx \times (f_x + n/V)]. \quad (11)$$

Thus, the output signal position is proportional to the input frequency and its intensity is proportional to the signal amplitude squared.

In summary then, the top-level performance and operating parameters for this type of (uniform weighted) analyzer are as follows:

1) The frequency resolution of the analyzer is $$Df = \frac{1}{N \times Dt}, \quad (12)$$

where $\Delta$t is the time delay between taps and N is the number of taps;

2) The unambiguous bandwidth for real signals (as determined by Nyquist sampling requirements) is given by $$B = \frac{1}{2 \times Dt}; \quad (13)$$

3) The space-bandwidth-product, or equivalently, the time-bandwidth-product (TBWP) is the number of resolution elements that can be realized in the unambiguous bandwidth. Thus, it is given by $$TBWP = \frac{B}{Df} = \frac{N}{2}. \quad (14)$$

We see that the TBWP is just one-half the number of taps.

For example, consider a spectrum analyzer constructed using a fiber wound on a circular cylinder. The number of taps N is equal to the height of the cylinder H divided by the diameter d of the fiber. With H=10 cm and d=50 □m then TBWP=1000. The propagation time between taps is $\Delta t = 2\pi r/v$ where r is the cylinder's radius and v the propagation velocity. With r=53 mm and v=2×10$^8$ m/sec then B=300 MHz and $\Delta f$=300 kHz. Thus, it is seen that a powerful analyzer is possible with this simple configuration.

In general, the SLM can also impart a weighting on the coefficients as well as correcting any phase and amplitude variations in the taps by letting $b_n = w_n/a_n$, where $w_n$ are the desired (complex) weights. In fact, the SLM can be considered to generate a transversal filtering operation. For the analyzer, we are assuming that the SLM is used to generate a uniform set of taps.

The light radiated from the taps of the FDR must be properly phased for analyzer operation. We have demonstrated the phases can be corrected by detecting the light in a digital holographic arrangement and making the phase (and amplitude) corrections with digital processing of the detected signals. The light from the end of the fiber is used after propagating past all the taps to be our reference source. If the source is as far away from the tap array as the width of the array then detecting the light with a camera with sufficient resolution will allow the spectrum to be determined.

Figure 2:
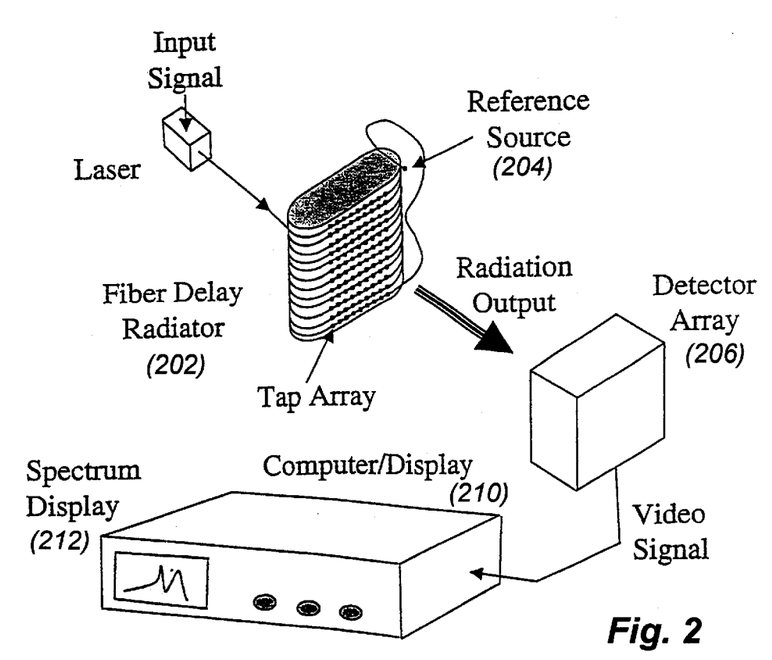
FIG. 2 depicts a digital holographic setup for spectrum analysis.

FIG. 2 shows an experimental setup for the digital holographic analyzer technique. In this particular case, the FDR 202 is fed with a signal centered at a wavelength about 840 nanometers. Light from the end of the fiber is used as the reference source 204 for the holographic process. Light radiated from the FDR and reference is captured by a digital camera (detector array) 206, and the resulting acquired electronic data (digital hologram) is processed by computer/display 210 to generate the spectrum 212 of the signal.

Figure 3:
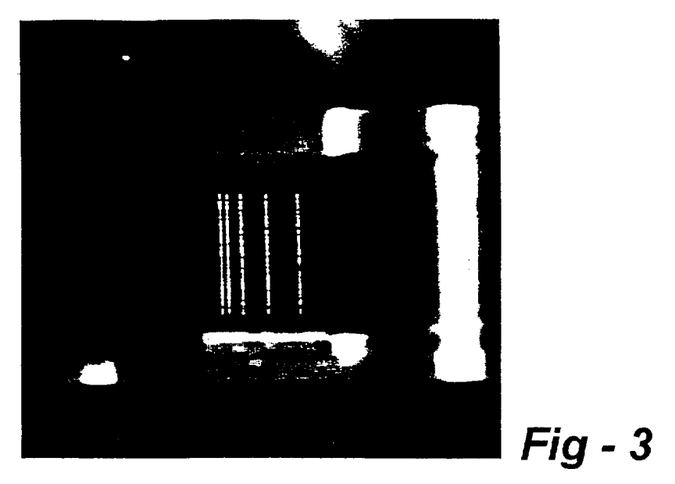
FIG. 3 shows an image of a fiber delay radiator (FDR) and reference source according to the invention.

FIG. 3 shows an image of the FDR and reference source. The bright broad areas are the aluminum housing and form for the FDR. The taps are seen as 5 lines of 100 taps each. The lines of taps are unequally spaced as a non-redundant array. The taps along the lines are equally spaced at about 0.28 mm. The reference source (output at end of fiber) is seen as the dot of light in the upper left hand corner of the image.

Figure 4:
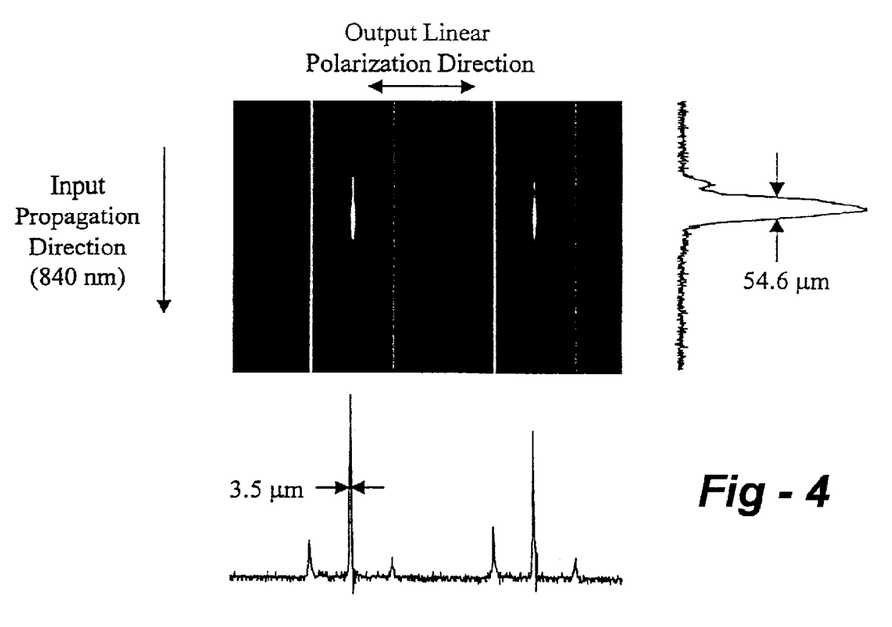
FIG. 4 shows two magnified taps and scans through the taps.

FIG. 4 shows two magnified taps and scans through the taps. The vertical lines are the outline of two loops of the fiber (cladding edges are seen). The taps are seen to be about 55 microns long in the direction of the fiber and about 4 microns in the orthogonal direction.

Figure 5:
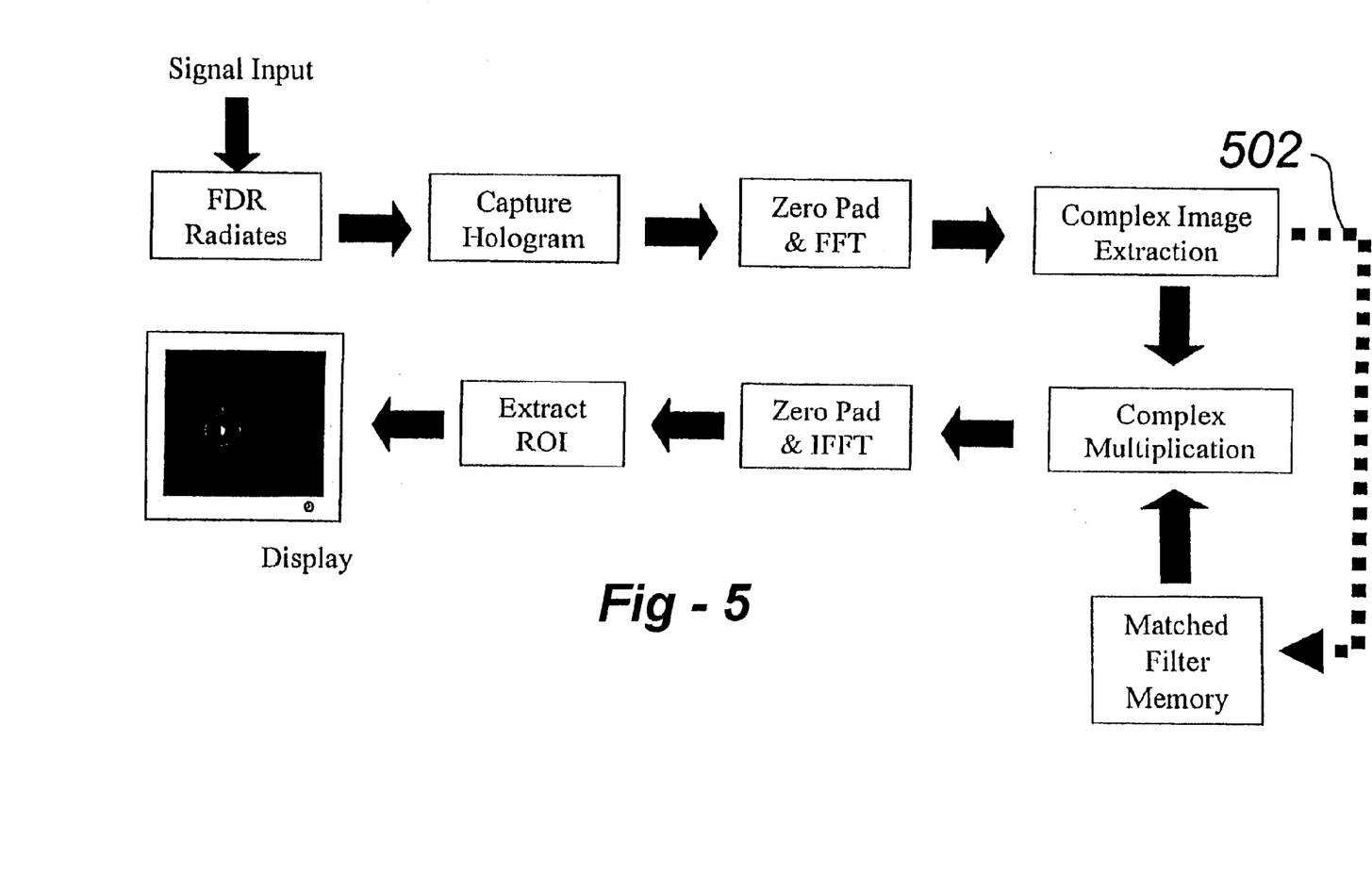
FIG. 5 illustrates a preferred processing flow to generate the desired spectrum of an input signal for the digital hologram technique.

FIG. 5 shows the digital holographic processing steps used in obtaining the spectrum of the signal. The dotted line 502 represents the path used to generate the matched filter. A key element of this processing is capturing a signal that serves as a matched filter. A single, known light frequency is preferably used as the input to generate the matched filter, which is then used to correct the phases (and amplitudes if desired) of the taps and to display the spectrum of the signal to be analyzed.

Figure 6:
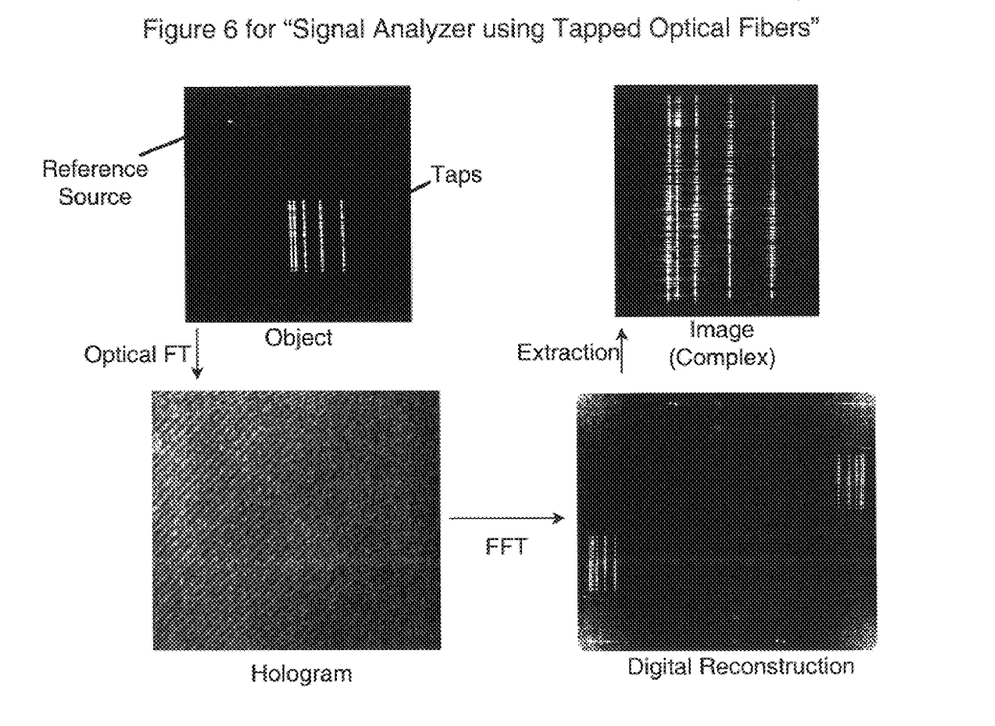
FIG. 6 presents experimental results for the first few steps of the digital holographic analyzer technique.

FIG. 6 presents experimental results for the first few steps of the digital holographic analyzer technique. We start with the object that consists of the FDR radiation and the reference source. The digital camera captures the hologram and transfers it to the computer. The hologram is Fast Fourier Transformed (FFTed) to produce two conjugate images of the FDR radiation image. One of the (complex) images is extracted for further processing. This image could be used as the matched filter if the desired matched filter signal was applied to the FDR. For spectral analysis the matched filter signal is a single frequency for which the spectrum will be centered.

Figure 7:
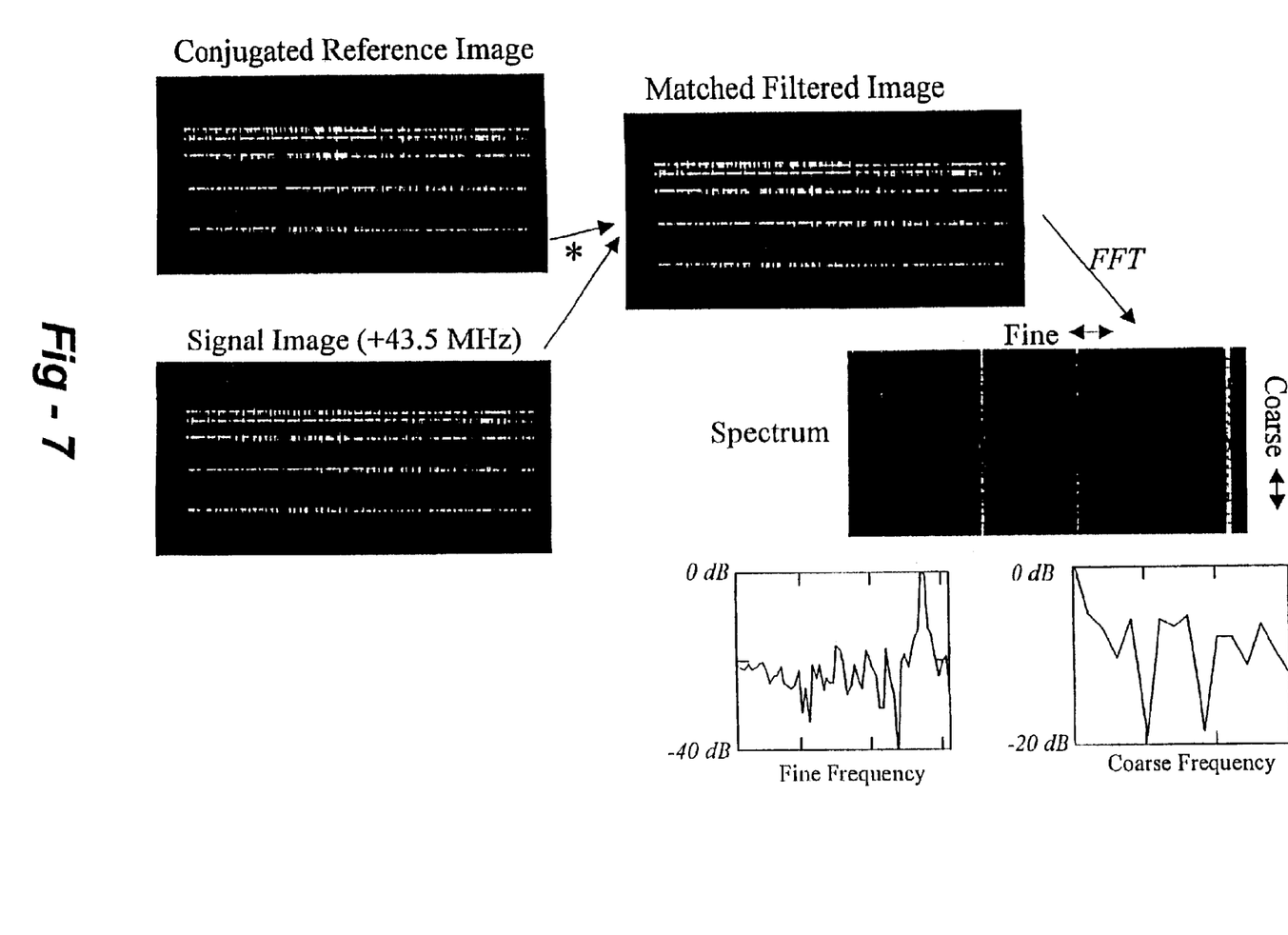
FIG. 7 shows the experimental results for the last processing steps of the digital hologram analyzer.

FIG. 7 shows the experimental results for the last processing steps of the digital hologram analyzer. The extracted image is multiplied against the conjugate of the matched filter. The result is FFTed to produce the spectrum. In this case, a signal that was inserted that was 43.5 Mhz different then the matched filter reference frequency. Plots are shown that give the expected output spectrum of the signal.

The use of fiber ribbons may be used to enhance the bandwidth, resolution, and efficiency of the analyzer, again assuming appropriate delays, which may be provided by loops prior to entry into the FDR. The signal is fed into each of the fibers having a delay equal to the cylinder circumference divided by the number of fibers in the ribbon, M. The result is conceptually equivalent to winding a single fiber onto a cylinder that is smaller in diameter by a factor of M. However, if the radius of the cylinder is too small it will cause excessive bending in the fiber which leads to high propagation losses and/or birefringence. This ribbon technique with multiple fibers alleviates this problem and gives the desired decrease in the interval sampling time $\Delta t$. Thus, the both the bandwidth and resolution width increase by a factor of M while the TBWP remains fixed.

The most general spectrum analyzer is formed with an M ribbon fiber, as described above, but with P equally spaced lines of taps to give a two-dimensional distribution of taps. This arrangement is equivalent to what is known as a raster-formatted optical spectrum analyzer. The output spectrum is also now raster formatted with fine frequency resolution along the dimension of the height axis of the cylinder and coarse frequency resolution in the orthogonal direction. Thus, a two-dimensional detector array works ideally to match the geometry of the power spectrum format and to electronically output the two-dimensional spectrum for display.

Figure 8:
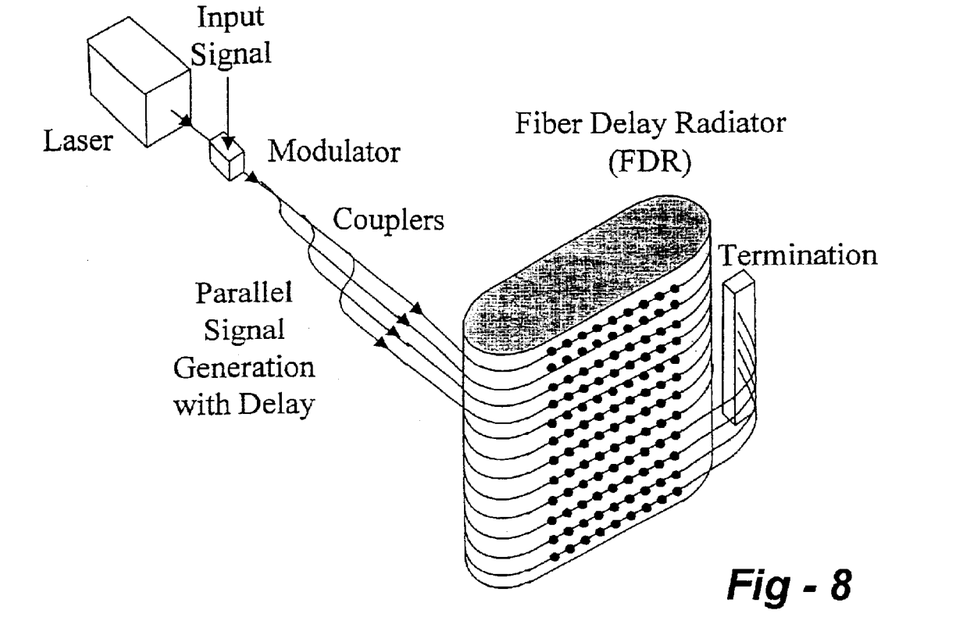
FIG. 8 illustrates a multiple fiber feed using the same signal with appropriate delays to produce a spectrum with essentially no gaps.
Figure 9:
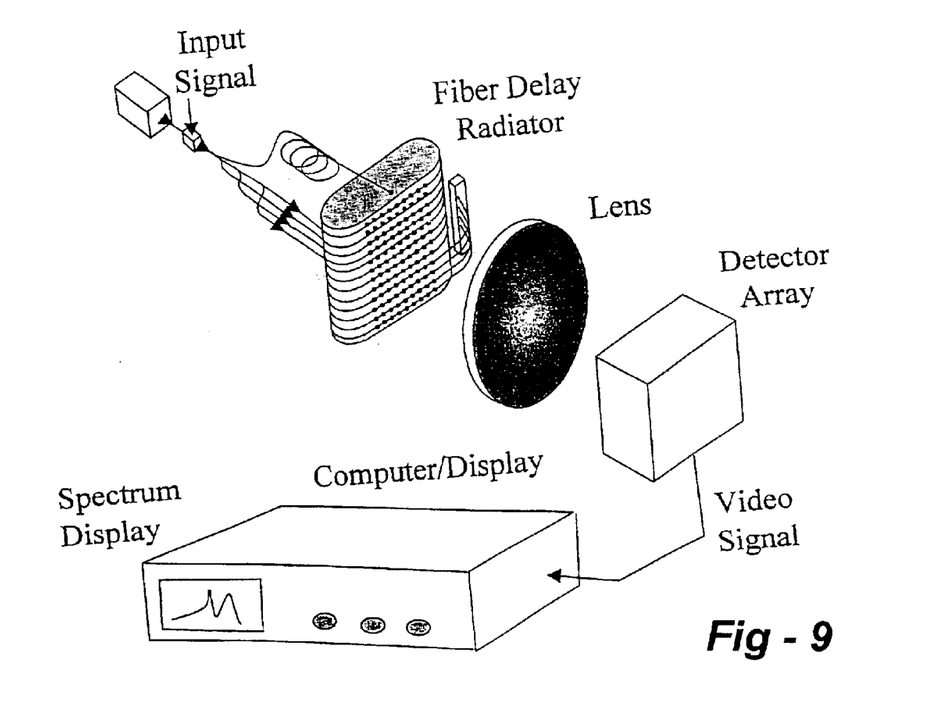
FIG. 9 illustrates the more general arrangement for the digital holographic analyzer technique using the multiple fiber feed device.
Figure 10:
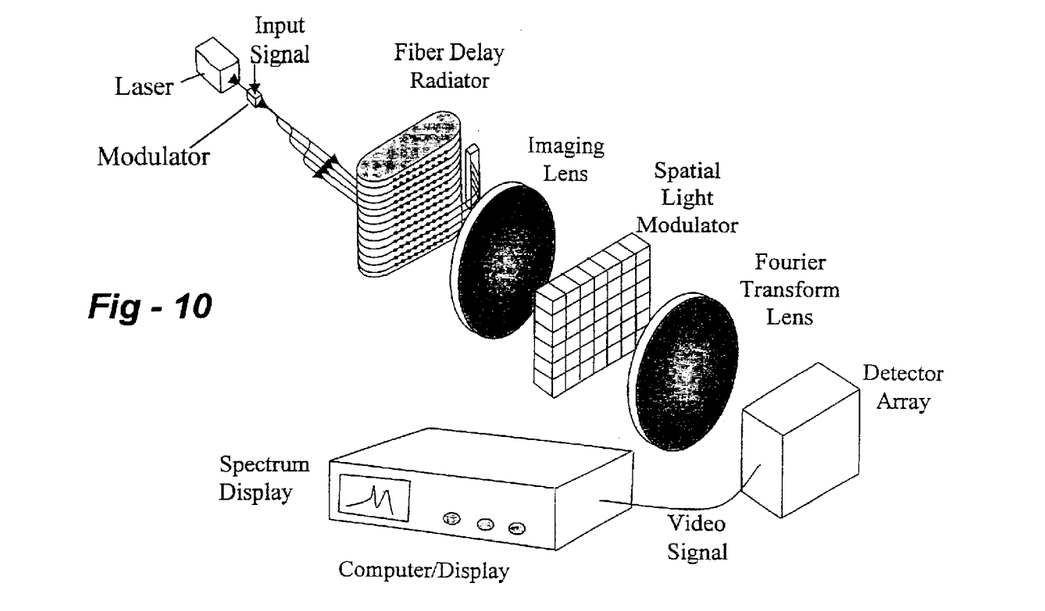
FIG. 10 shows the more general arrangement for the analyzer using the SLM (spatial light modulator) as an element to correct and modify the tap outputs.

FIG. 8 illustrates a multiple fiber feed using the same signal with appropriate delays to produce a spectrum with essentially no gaps. FIG. 9 illustrates the more general arrangement for the digital holographic analyzer technique using the multiple fiber feed device. FIG. 10 shows the more general arrangement for the analyzer using the SLM (spatial light modulator) as an element to correct and modify the tap outputs. The spectrum can detected with the detector array with minimum processing. This configuration allows for channelizer operation when a real-time detector is used. The frequency resolution for the M ribbon fiber is now given by $$Df = \frac{M}{N \times t} \quad (15)$$

where $\tau$ is the time for a single trip around the cylinder, i.e., it equals the cylinder's circumference divided by the propagation velocity and N is still the number of taps along a tap line. The bandwidth is now given by $$B = \frac{M \times P}{2 \times \tau} \tag{16}$$

and the TBWP is now given by $$TBWP = \frac{N \times P}{2} \tag{17}$$

Thus, the TBWP is still equal to half the number of taps. The number of fibers in the ribbon can be used to tradeoff between resolution and bandwidth. For example, using τ=5 nsec, M=3, N=600, and P=100, then Δf=1 MHz, B=30 GHz, and TBWP=30,000. It is clear that the potential performance of such a two-dimensional spectrum analyzer is outstanding.

Tap Generation

The generation of the taps with controlled efficiencies is critical technology to be developed. In this section, tap generation techniques are presented. Although other techniques have been developed to tap light out of a fiber, the potentially most controllable and versatile technique is modifying the refractive index in core of the fiber by using UV (ultraviolet) light. Bragg grating filters are now commonly made with this technique. Blazed or side-tapping Bragg gratings are much less developed.

Figure 11A:
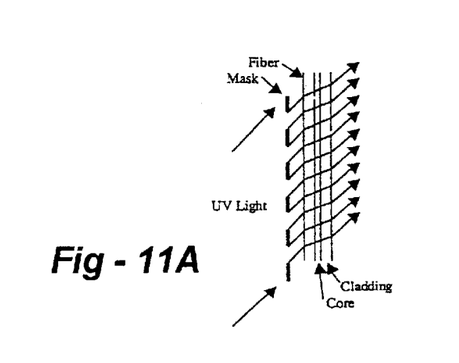
FIG. 11A depicts a series of angled steps fabricated simultaneously using a metallic mask with alternating opaque and open areas, allowing alternating patches of light to penetrate into the fiber to alter its refractive index.
Figure 11B:
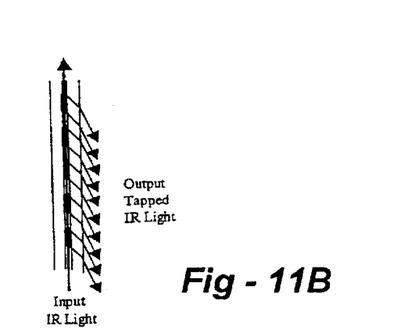
FIG. 11B shows how light can be reflected out of the fiber generated according to FIG. 11A at a desired angle.

Consider first the generation of refractive index steps in the core of a fiber. A series of angled steps has been created simultaneously using a metallic mask with alternating opaque and open areas as illustrated in FIG. 11A. Here, UV light at a wavelength of 244 nm floods the mask allowing alternating patches of the light to penetrate into the fiber. In the regions where the light penetrates into the core, its refractive index increases. The resulting boundaries of the refractive changes will act as beamsplitters to light propagating in the fiber. As illustrated in FIG. 11B, light can be reflected out of the fiber at an angle dependent on the tilt of the beamsplitters. This type of grating may be considered a "long period grating," though we do not want back-reflection resonance to be established at the operating wavelength as is often the desired case for fiber filters.

Figure 12:
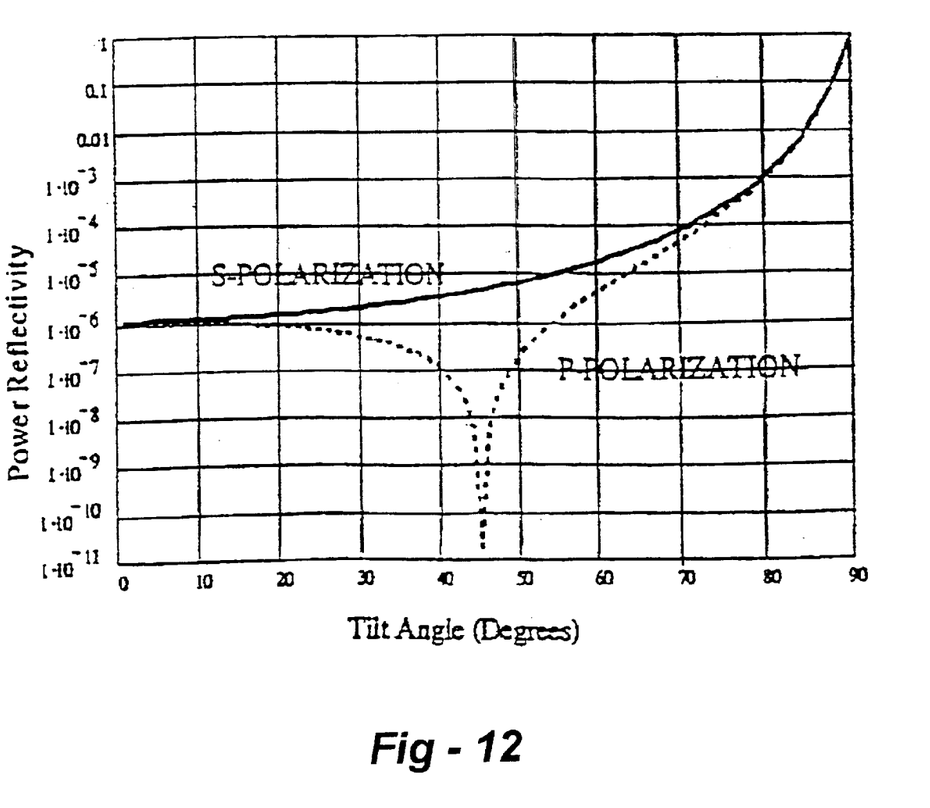
FIG. 12 shows a calculated power reflectivity from a beamsplitter formed by a refractivity change as a function of the tilt angle measured from the normal to the fiber axis.

FIG. 12 shows a calculated power reflectivity from a beamsplitter formed by a refractivity change of 1.456 to 1.459 as a function of the tilt angle measured from the normal to the fiber axis. Although the refractive index change was not measured, increases of over $10^{-3}$ have been reported. As shown in the graph, tilt angles corresponding to 20 degrees or thereabouts would not expect to yield more than a $2 \times 10^{-6}$ power reflectivity from a taps at either polarization. For our purposes, we would like to operate with greater efficiencies, and at a 45-degree tilt in order for the beam to exit perpendicular to fiber axis and with a single polarization state.

Notice also that the Brewster angle approaches 45 degrees as the indices on the two sides of the beamsplitter approach each other. Thus, we would like to operate with a 45 degree tilt and with greater efficiencies. The tap efficiency can be increased by generating 45 degree Bragg gratings within the core of the fiber to act as the tapping structure, which we will now consider.

A Bragg grating in a fiber is a periodic refractive index structure within the core that produces a coherent summation of the light along its length to enhance the output refracted intensity. The Bragg grating requirement is given by $$L = \frac{N \times l}{2 \times n \times \cos q} \tag{18}$$

where Λ is the grating period (measured normal to the 3-D fringes), N is the diffraction order, λ the free space wavelength of the light propagating in the fiber, n the effective refractive index for the assumed single mode, and θ is the tilt of the grating in the core. For example, if N=1, n=1.45, λ=840 nm, θ=45 degrees, then Λ=409 nm.

The fiber has been stripped of its acrylate coating, which is opaque to this UV light, leaving the fiber cladding and core to be changed by the UV light. The initial technique we used for making the taps under our current NSA contract was to strip the coating from the fiber and then illuminate stripped portion of the fiber with ultraviolet (UV) fringes from an interferometer. The UV light source was a laser operating at a wavelength of 244 nm. The fringes were tilted at 45 degrees to the fiber core and the infrared (IR) signal light would exit in a plane normal to the UV light.

Figure 13:
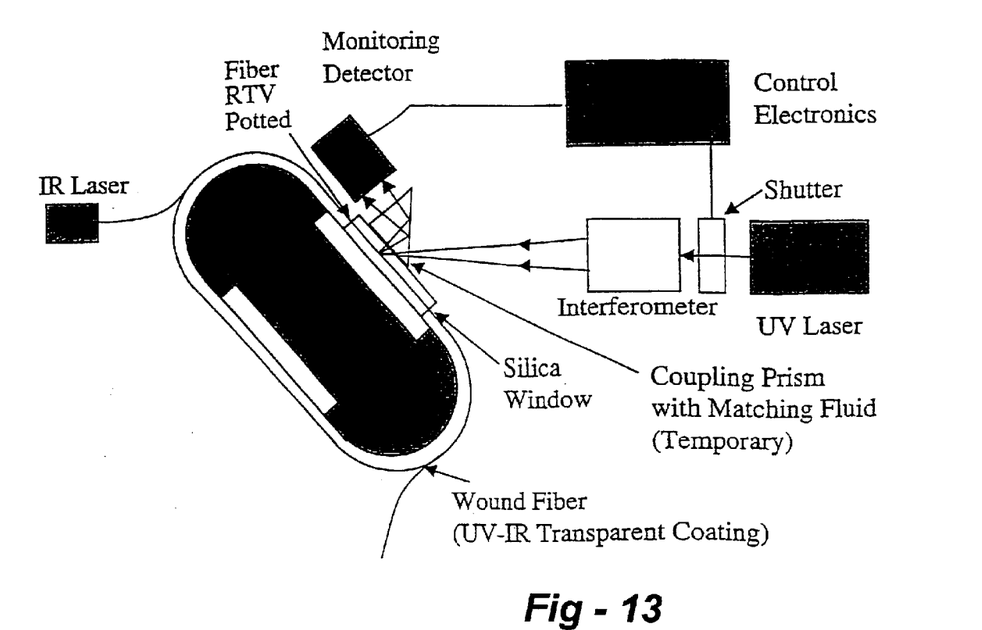
FIG. 13 shows how the use of a prism allows an IR signal light to be coupled out of the tap and be monitored for its intensity as the tap is being generated.

The current improved technique to make the taps uses a specially coated fiber. The coating is GE RTV615 material that is transparent to the UV light (244 nm wavelength) and transparent to the output 840 nm wavelength light. Thus, no stripping of the fiber is required and the fiber can be placed in its final position before the taps are generated. In fact, the fiber is wound on the FDR form and fused silica windows are potted over the wound fiber with the same RTV615 material. The taps are then generated through the windows using the UV light. A fused silica prism is temporarily coupled to the window with index matching liquid to allow gratings at 45 degrees to be generated in the core of the fiber. As before, the UV light at 244 nm is sent through a interferometer to produce fringes for the generation of the gratings in the core. The spacing of the gratings is picked to be a Bragg grating to maximum coupling efficiency for a given exposure level. The prism also allows the IR signal light to be coupled out of the tap and be monitored for its intensity as the tap is being generated. See FIG. 13.

By moving the FDR form over 3 dimensions an arbitrarily array of 2-dimensional taps can be generated with controlled efficiencies. It is the signal light radiated from this array of taps that is captured and used to determine the spectrum of the signal. If a continuous spectrum with no coverage gaps is desired, then a multiple fiber FDR is required. For signal analysis, the multiple fibers are driven by the same light modulator but with each fiber having a different delay determined by the fiber feed lengths.

Figure 14:
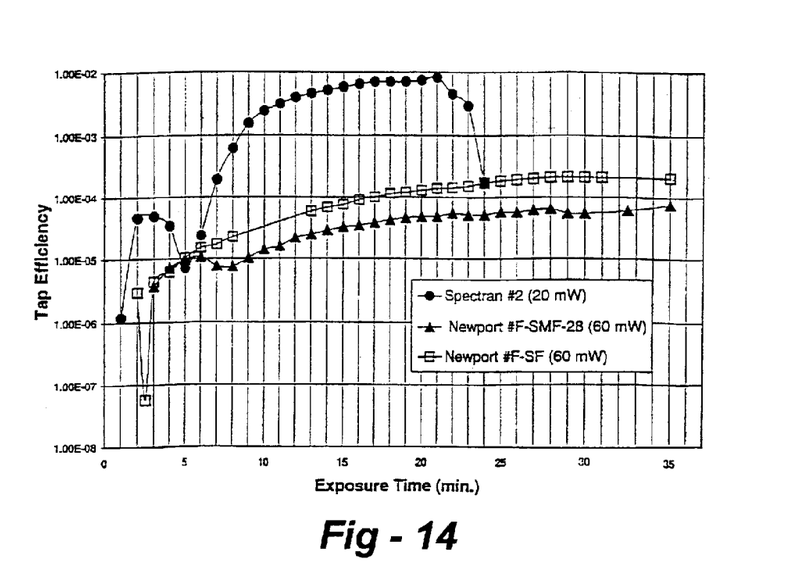
FIG. 14 shows resulting taps in a SpecTran photosensitive fiber.

FIG. 14 shows the plot of output light from Bragg taps as a function of the UV exposure times in various fibers using the indicated UV laser power focused to a 30 m spot diameter. Notice the typical dips in the efficiency curves early in the exposure range. Gratings formed before the dip are known as Type 1. Those formed after the dip are known as Type 2 gratings. Type 1 gratings decay in output tap efficiency with time, while Type 2 do not.

The Newport fibers are commercial communication fibers without any special doping or treatment. The SpecTran fiber has a proprietary doping in the core to make it more sensitive to UV light. Note that nearly 1 percent tapping efficiency was obtained for these nominally 30 μm long taps. Taps made with longer length gratings at the same exposure level can increase the output even further. However, for our purposes, higher tap efficiencies are not required. It is believed that the tap efficiency decrease with longer exposure times is due to the bias UV saturating the available refractive index change.

In summary, the embodiments described herein afford a large time-bandwidth-product spectral analysis with fine frequency resolution. The preferred embodiment uses a localized, two-dimensional array of taps and phase correction for the taps using matched filtering using holographic or SLM techniques. A phase spatial modulator is preferably to correct the phases of the taps for channelizer and spectral analysis operation. Alternatively, digital holography techniques can be used without a SLM for spectral analysis. It will be appreciated by those of skill in the art, however, that alternate modes of construction are possible according to the invention. For example, a) The tilt of the gratings may be at other angles than 45 degrees and the light can emerge at other then normal to the fiber with other than linear polarization. Subsequent polarizers may be needed to control the emerged light. Lower tilt angles may allow the UV light to form fringes without a prism.

b) Multiple parallel fibers with a common signal feed but with different delays may be wound on the form to separate spectral band overlaps.

c) Lenslet arrays may be used over the taps to increase the overall efficiency of the process.

d) A polarization-maintaining fiber may be used instead of the uniform fiber.

e) Non-photosensitized fibers may also be used.

f) Standard coated fibers and use of longer UV wavelength, e.g., around 350 nm, may be used to form the taps.

g) Taps could be formed by laser ablation of the core/cladding.

h) A spatial light modulator could be used to control the tap phases.

The invention also finds application in a wide variety of commercial situations including, but not limited to:

a) to analyze signals that have been modulated on light propagating in a fiber.

b) to analyze telecommunication channels in optical fiber network links.

c) to analyze optical sources by determining their spectral characteristics.

d) as part of a spectrometer to analyze gases and other materials.

e) the spatial modulator version could be used as a phased array for Ladar and Lidar applications.

f) the spatial modulator version could be used as a beam director for data storage and other scanning applications.

g) the spatial modulator version could be used as a channelizer for use in separating out and monitoring individual signal channels.

I claim:

1. A real-time optical channelizer, comprising:

a fiber delay radiator (FDR) formed by winding at least one optical fiber on a form, the fiber including a plurality of taps allowing the light carried by the fiber to radiate therefrom;

an optical detector; and a two-dimensional spatial light modulator disposed in an optical path between the taps and the detector to correct at least for the phase of the light radiated by the FDR.

2. The channelizer of claim 1, wherein the two-dimensional spatial light modulator further corrects of the amplitude of the light radiated by the FDR.

3. The channelizer of claim 1, wherein the two-dimensional spatial light modulator comprises a fixed holographic matched filter.

4. The channelizer of claim 1, wherein the two-dimensional spatial light modulator comprises a varying transversal filter.

5. The channelizer of claim 1, wherein the taps are arranged as a two-dimensional array to produce a desired two-dimensional radiation pattern.

6. The channelizer of claim 1, wherein the taps are tilted gratings embedded within the fiber.

7. The channelizer of claim 6, wherein the gratings are tilted at substantially 45 degrees.

8. The channelizer of claim 6, wherein the gratings are Bragg or long-wave gratings.

9. The channelizer of claim 6, wherein the taps are formed by:

bonding an optically transparent window over a portion of the fiber on the form; and exposing the fiber at points using ultraviolet light.

10. The channelizer of claim 9, further including the use of a prism or other light-directing element to generate steep tilted grating taps.

11. The channelizer of claim 6, further including a device for monitoring the output of the taps during their generation to control their final efficiency.

12. The channelizer of claim 6, further including:

a plurality of fiber wound on the core, each fed by a common modulated signal source; and wherein the multiple fibers are cut to proper lengths to achieve desired spectral analyzer coverage.

13. The channelizer of claim 1, further including a digital holographic signal analyzer configuration using the light from the end of the fiber, or from another fiber coupled to the signal fiber, as the reference source.

14. The channelizer of claim 1, further including the use of a non-redundant tap array to allow phase correction in a direct detection analyzer without needing a reference wave for holographic recording.

* * * * *

UNITED STATES PATENT AND TRADEMARK OFFICE
CERTIFICATE OF CORRECTION

PATENT NO. : 6,611,645 B2
DATED : August 26, 2003
INVENTOR(S) : Carl Aleksoff

It is certified that error appears in the above-identified patent and that said Letters Patent is hereby corrected as shown below:

Column 2,
Lines 36 and 38, replace "." with -- ; --.

Column 3,
Line 10, after "similar" insert -- to --.

Line 43, replace " $h_I(x) = \overset{M}{\underset{n=M}{a}} a_n \times d(x - n \times Dx)$ " with -- $h_I(x) = \sum_{n=-M}^{M} a_n \cdot \delta(x - n \cdot \Delta x)$ --.

Line 47, replace "$V = \Delta xv / l$" with -- $V = \Delta xv / \ell$ --.
Line 50, replace "$l$" with -- $\ell$ --.

Line 57, replace " $u(x,t) = s\left(t - \frac{x}{V}\right) \times h(x)$ " with -- $u(x,t) = s\left(t - \frac{x}{V}\right) \cdot h_I(x)$ --.

Line 60, replace " $h(x) = \overset{M}{\underset{n=M}{a}} a_n \times b_n \times d(x - n \times Dx)$ " with -- $h_I(x) = \sum_{n=-M}^{M} a_n \cdot b_n \cdot \delta(x - n \cdot \Delta x)$ --.

Line 66, replace " $U(f_x,t) = Ou(x,t) > exp(-i2p \times x \times f_x) \times dx$ " with -- $U(f_x,t) = \int u(x,t) \cdot exp(-i2\pi \cdot x \cdot f_x) \cdot dx$ --.

Column 4,
Line 5, replace " $U(f_x,t) = -V > exp(-i2p V \times t \times f_x) \times [S(-V \times f_x) \ddot{A} H(f_x)]$ " with
-- $U(f_x,t) = -V \cdot exp(-i2\pi V \cdot t \cdot f_x) \cdot [S(-V \cdot f_x) \otimes H(f_x)]$ --.

Line 12, replace " $H(fx) = \overset{M}{\underset{n-M}{a}} a_n \times b_n \times exp(-i2p \times n \times Dx \times f_x)$ " with
-- $H(f_x) = \sum_{n=-M}^{M} a_n \cdot b_n \cdot exp(-i2\pi \cdot n \cdot \Delta x \cdot f_x)$ --.

Line 20, replace " $H(f_x) = \frac{sin(p \times N \times Dx \times f_x)}{N \times sin(p \times Dx \times f_x)}$ " with -- $H(f_x) = \frac{sin(\pi \cdot N \cdot \Delta x \cdot f_x)}{N \cdot sin(\pi \cdot \Delta x \cdot f_x)}$ --.

Line 30, replace " $H(f_x) >> sinc(N \times Dx \times f_x)$ " with -- $H(f_x) \approx sinc(N \cdot \Delta x \cdot f_x)$ --.

Line 32, replace "$B sin(p z)/ p z$" with -- $= sin(\pi z) / \pi z$ --.
Line 34, before "$/ \Delta x$" insert -- 1 --.
Line 34, before "$/ N \cdot \Delta x$" insert -- 1 --.
Line 36, replace "$f_x$" with -- $Vf_x$ --.

Line 45, replace " $|U(f_x,t)|^2 = |V \times S(-V \times f_x) \ddot{A} H(f_x)|^2$ " with -- $|U(f_x,t)|^2 = |V \cdot S(-V \cdot f_x) \otimes H(f_x)|^2$ --.

Line 47, replace " $s(t) = A > exp(2 p i \times n \times t)$ " with -- $s(t) = A \times exp(2 p i \times n \times t)$ --.

UNITED STATES PATENT AND TRADEMARK OFFICE
CERTIFICATE OF CORRECTION

PATENT NO. : 6,611,645 B2
DATED : August 26, 2003
INVENTOR(S) : Carl Aleksoff

It is certified that error appears in the above-identified patent and that said Letters Patent is hereby corrected as shown below:

Column 4 (cont'd),

Line 50, replace " $|U(f_x,t)|^2 = A^2 \times sinc^2[N \times Dx \times (f_x + n/V)]$ " with -- $U^2 = |A^2 \cdot sinc^2[N \cdot \Delta x \cdot (f_x + v/V)]$ --.

Line 62, replace " $Df = \dfrac{1}{N \times Dt}$ " with -- $\Delta f = \dfrac{1}{N \cdot \Delta t}$ --.

Column 5,
Line 3, replace " $B = \dfrac{1}{2 \times Dt}$ " with -- $B = \dfrac{1}{2 \cdot \Delta t}$ --.

Line 10, replace " $TBWP = \dfrac{B}{Df} = \dfrac{N}{2}$ " with -- $TBWP = \dfrac{B}{\Delta f} = \dfrac{N}{2}$ --.

Line 18, replace "$d=50$ □m" with -- $d=50$ $\mu$m --.

Column 6,
Line 37, replace "the both the" with -- both the --.
Line 58, after "spectrum can" insert -- be --.

Line 63, replace " $Df = \dfrac{M}{N \times t}$ " with -- $\Delta f = \dfrac{M}{N \cdot \tau}$ --.

Column 7,
Line 5, replace " $B = \dfrac{M \times P}{2 \times t}$ " with -- $B = \dfrac{M \cdot P}{2 \cdot \tau}$ --.

Line 10, replace " $TBWP = \dfrac{N \times P}{2}$ " with -- $TBWP = \dfrac{N \cdot P}{2}$ --.

UNITED STATES PATENT AND TRADEMARK OFFICE
CERTIFICATE OF CORRECTION

PATENT NO.    : 6,611,645 B2
DATED         : August 26, 2003
INVENTOR(S)   : Carl Aleksoff It is certified that error appears in the above-identified patent and that said Letters Patent is hereby corrected as shown below:

Column 8,
Line 5, replace " $L = \dfrac{N \times l}{2 \times n \times \cos q}$ " with -- $\Lambda = \dfrac{N \cdot \lambda}{2 \cdot n \cdot \cos \theta}$ --.

Signed and Sealed this

Fourteenth Day of June, 2005

JON W. DUDAS
*Director of the United States Patent and Trademark Office*